United States Patent

Shiau

[11] Patent Number: 5,988,963
[45] Date of Patent: Nov. 23, 1999

[54] CARGO POSITIONING FRAME

[76] Inventor: Hing-Horng Shiau, 58, Ma Yuan West St., Taichung, Taiwan

[21] Appl. No.: 09/179,370
[22] Filed: Oct. 26, 1998
[51] Int. Cl.[6] .................................................... B60P 7/15
[52] U.S. Cl. ......................... 410/151; 410/143; 410/149
[58] Field of Search .................................. 410/143, 145, 410/149, 151; 211/105.3, 105.5, 105.6; 248/354.7, 354.1, 354.6; 254/12, 95, 112; 74/141.5, 167, 169

[56] References Cited

U.S. PATENT DOCUMENTS

| | | | |
|---|---|---|---|
| 4,256,425 | 3/1981 | Burgess et al. | 410/149 |
| 4,650,383 | 3/1987 | Hoff | 410/149 |
| 5,104,269 | 4/1992 | Hardison | 410/149 |
| 5,443,342 | 8/1995 | Huang | 410/151 |
| 5,472,301 | 12/1995 | Wallen | 410/151 |
| 5,769,580 | 6/1998 | Purvis | 410/151 |
| 5,833,414 | 11/1998 | Feldman et al. | 410/151 |
| 5,890,856 | 4/1999 | Huang | 410/151 |

FOREIGN PATENT DOCUMENTS

| 616129 | 3/1961 | Canada | 254/12 |
|---|---|---|---|

*Primary Examiner*—Stephen T. Gordon

[57] ABSTRACT

A tube of a cargo positioning frame is made of a plate. The plate has a plurality of positioning holes and a plurality of upper chamfer angled holes. Each of the upper chamfer angled holes communicates with the respective positioning hole. The plate is bent to form the tube.

2 Claims, 6 Drawing Sheets

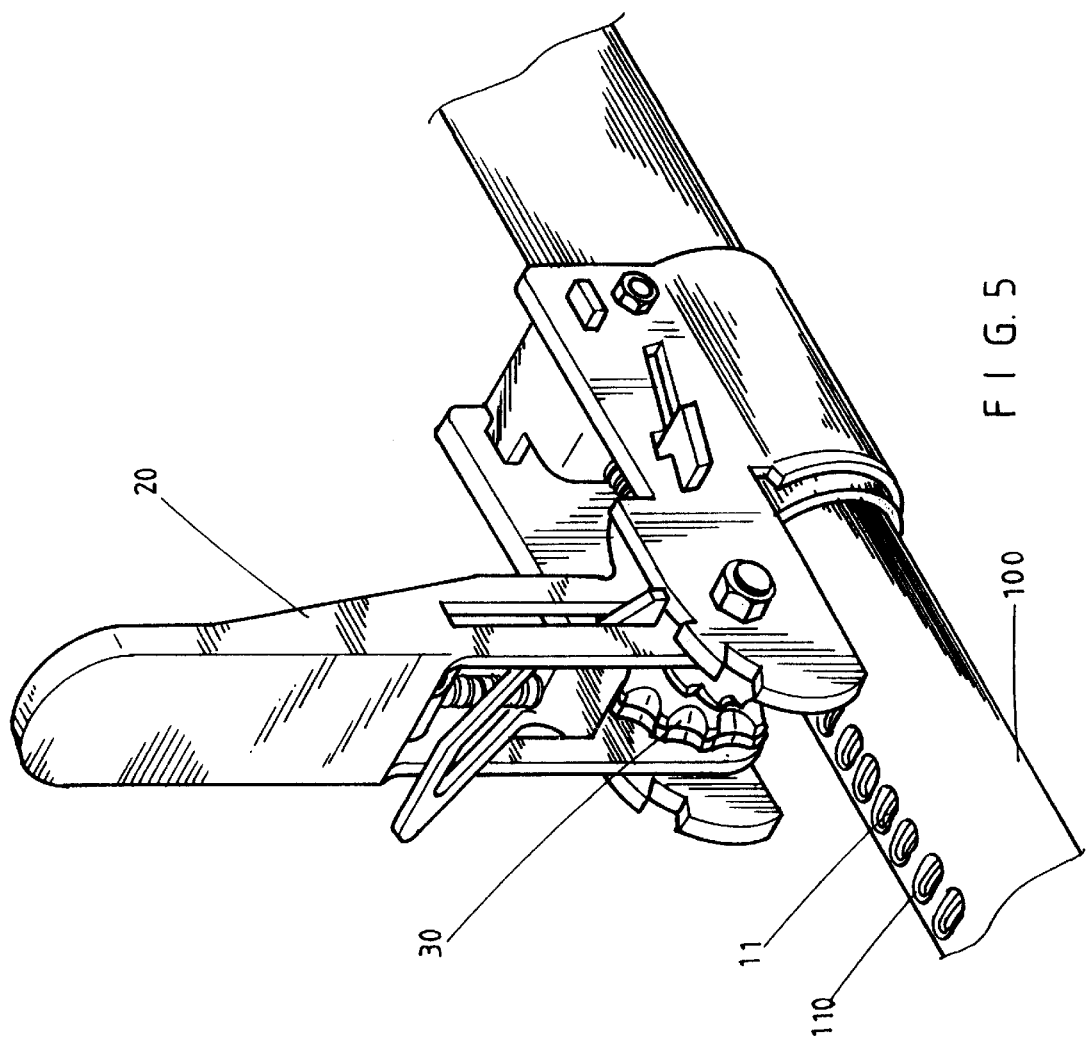

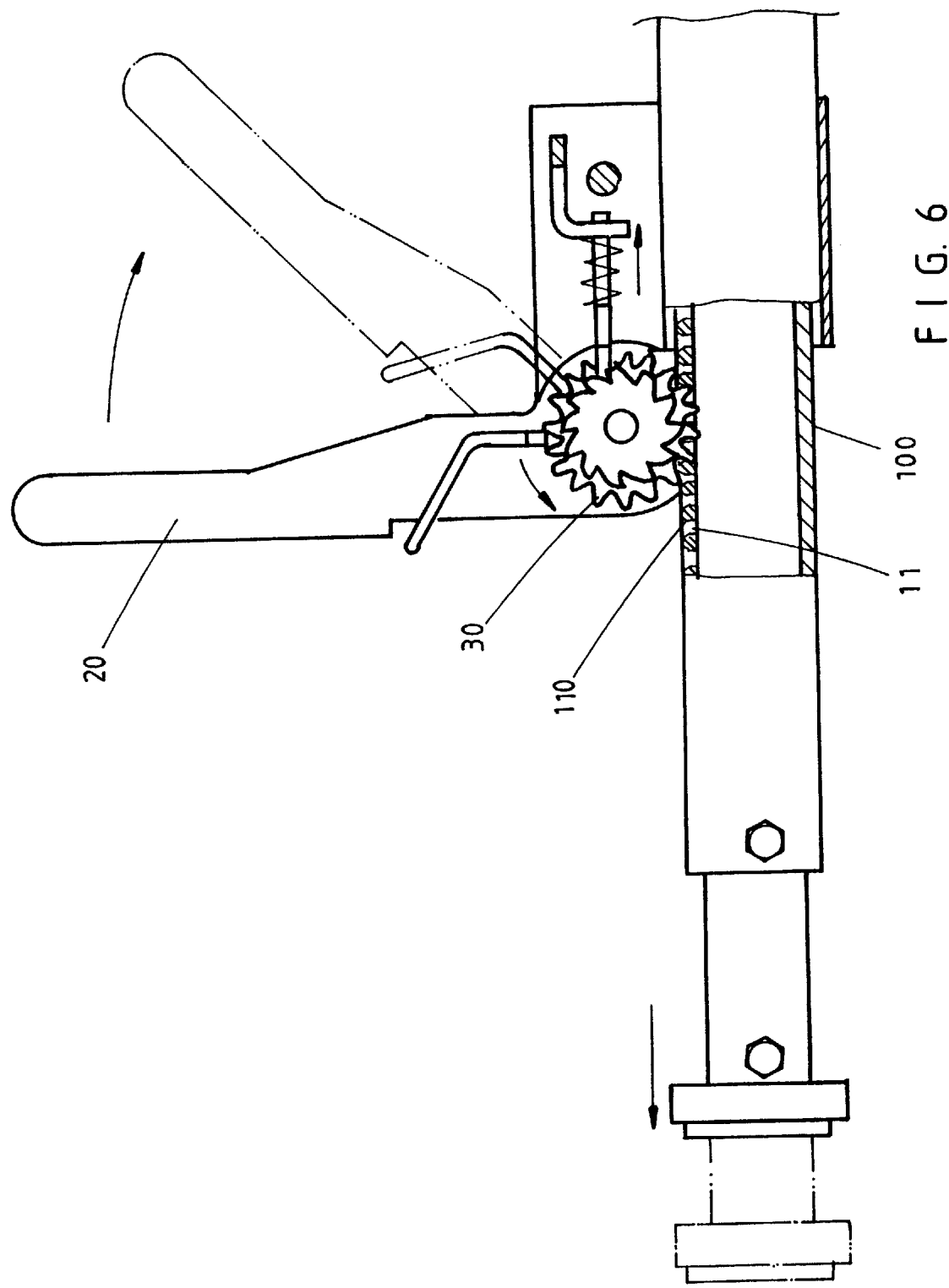
F I G. 6

CARGO POSITIONING FRAME

BACKGROUND OF THE INVENTION

The present invention relates to a cargo positioning frame for a truck. More particularly, the present invention relates to a specific tube of a cargo positioning frame.

A conventional cargo positioning frame has a solid rack. However, a rack is very heavy. Referring to FIG. 1, a pipe 90 can replace a conventional rack. The pipe 90 has a plurality of oblong holes 91. However, a pawl or a tooth cannot be positioned in the oblong hole 91 stably.

SUMMARY OF THE INVENTION

An object of the present invention is to provide a specific tube which has an upper chamfer angled hole communicating with a positioning hole in order to position a pawl stably.

Accordingly, a plate comprises a plurality of positioning holes and a plurality of upper chamfer angled holes. Each of the upper chamfer angled holes communicates with the respective positioning hole. The plate is bent to form the tube.

In accordance with a first preferred embodiment of the present invention, a shock-absorbing device is connected to a tube. The tube comprises a plurality of positioning holes and a plurality of upper chamfer angled holes. Each of the upper chamfer angled holes communicates with the respective positioning hole. The shock-absorbing device comprises a connection pipe inserted in the tube, a base seat inserted in the connection pipe, an elastic element inserted in the connection pipe, and a bolt fastening the connection pipe and the base seat together. A retainer rod fastens the tube and the connection pipe together. The elastic element is disposed between the retainer rod and the base seat.

In accordance with a second preferred embodiment of the present invention, a cargo positioning frame comprises a handle and a ratchet device. A tube is inserted through the cargo positioning frame. The handle drives the ratchet device to rotate. The upper chamfer angled hole guides the ratchet device entering the respective positioning hole precisely.

BRIEF DESCRIPTION OF THE DRAWINGS

FIG. 5 is a perspective view of a cargo positioning frame of a first preferred embodiment in accordance with the present invention;

FIG. 6 is a schematic view illustrating an operation of a cargo positioning frame of a first preferred embodiment in accordance with the present invention;

DETAILED DESCRIPTION OF THE INVENTION

Figure 1:
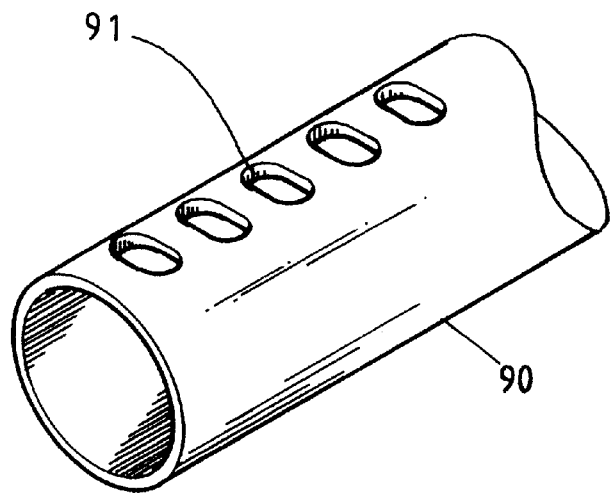
FIG. 1 is a perspective view of a conventional pipe of the prior art.
Figure 4:
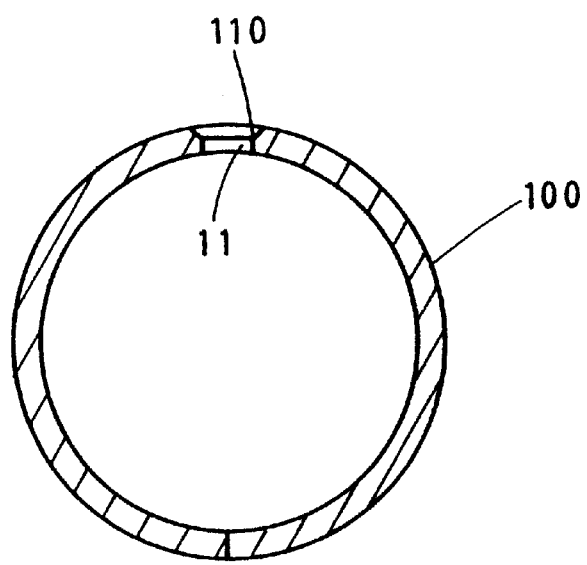
FIG. 4 is a sectional view of FIG. 3.
Figure 2:
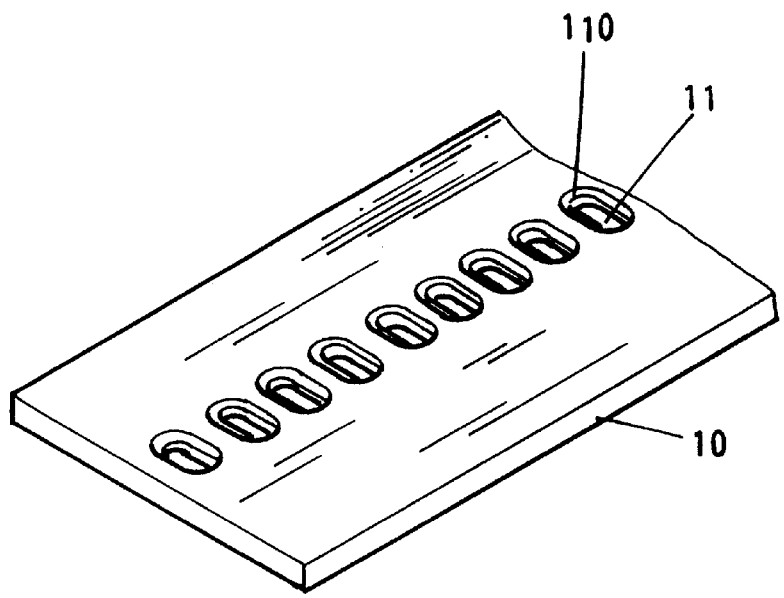
FIG. 2 is a perspective view of a plate of a first preferred embodiment in accordance with the present invention.
Figure 3:
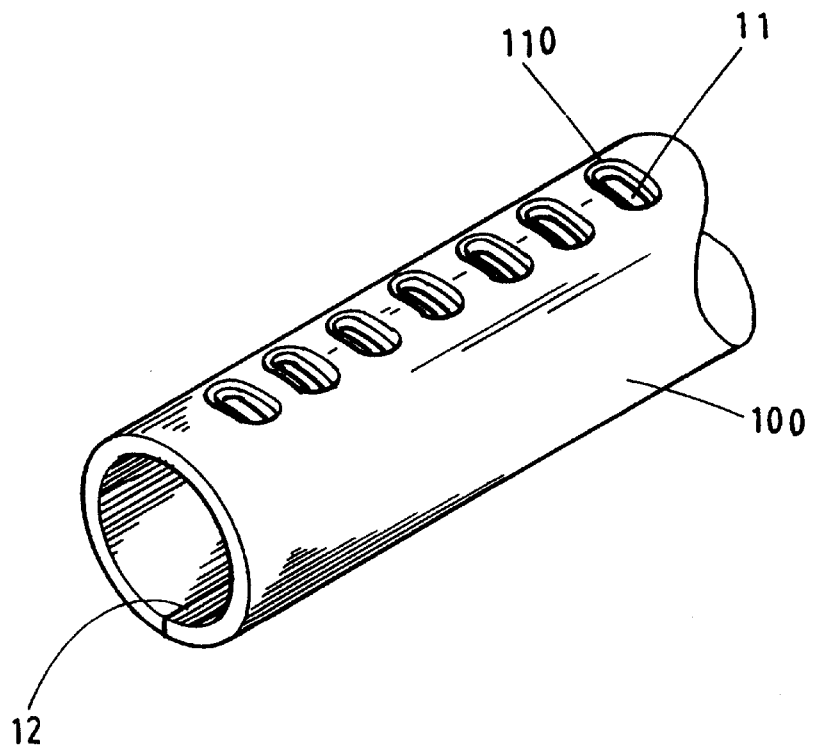
FIG. 3 is a perspective view of a specific tube of a first preferred embodiment in accordance with the present invention.

Referring to FIGS. 2 to 4, a tube 100 of a cargo positioning frame is made of a plate 10. The plate 10 has a plurality of positioning holes 11 and a plurality of upper chamfer angled holes 110. Each of the upper chamfer angled holes 110 communicates with the respective positioning hole 11. The plate 10 is bent to form the tube 100. The tube 100 comprises a connection line 12, a plurality of positioning holes 11 and a plurality of upper chamfer angled hole 110. Each of the upper chamfer angled holes 110 communicates with the respective positioning hole 11.

Referring to FIGS. 5 and 6, a cargo positioning frame comprises a handle 20 and a ratchet device 30. The tube 100 is inserted through the cargo positioning frame. The handle 20 drives the ratchet device 30 to rotate. The upper chamfer angled hole 110 guides the ratchet device 30 entering the respective positioning hole 11 precisely.

Figure 7:
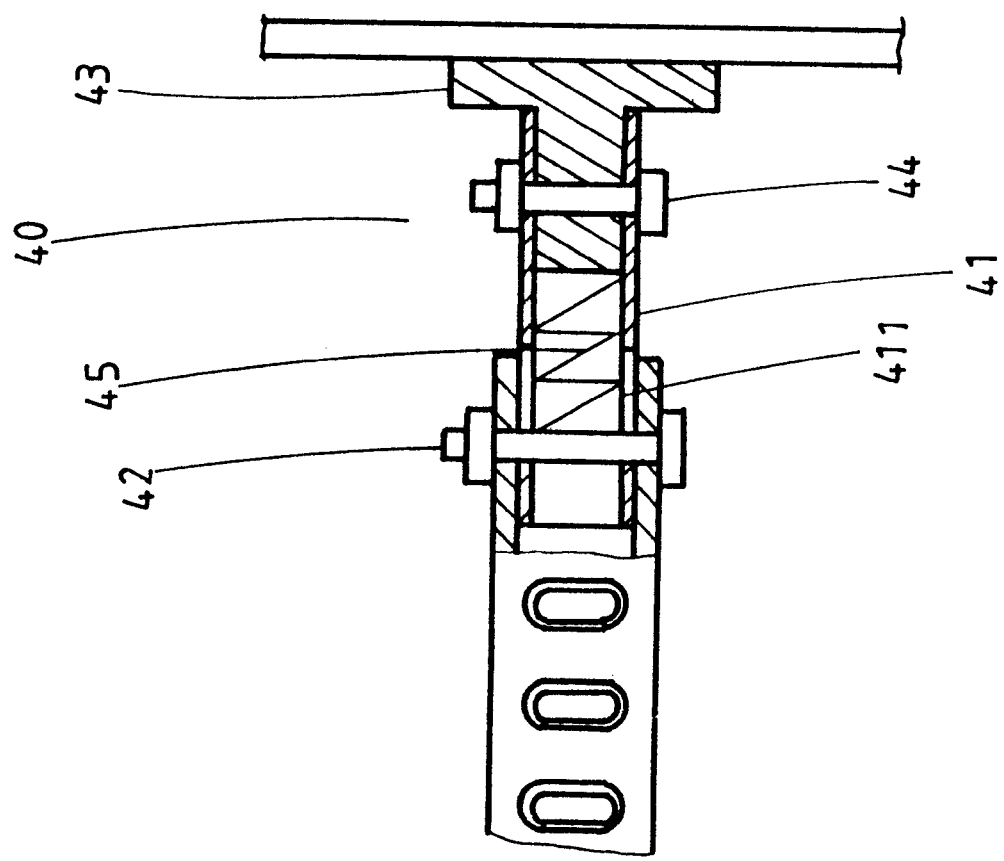
FIG. 7 is a perspective view of a cargo positioning frame of a second preferred embodiment in accordance with the present invention.
Figure 8:
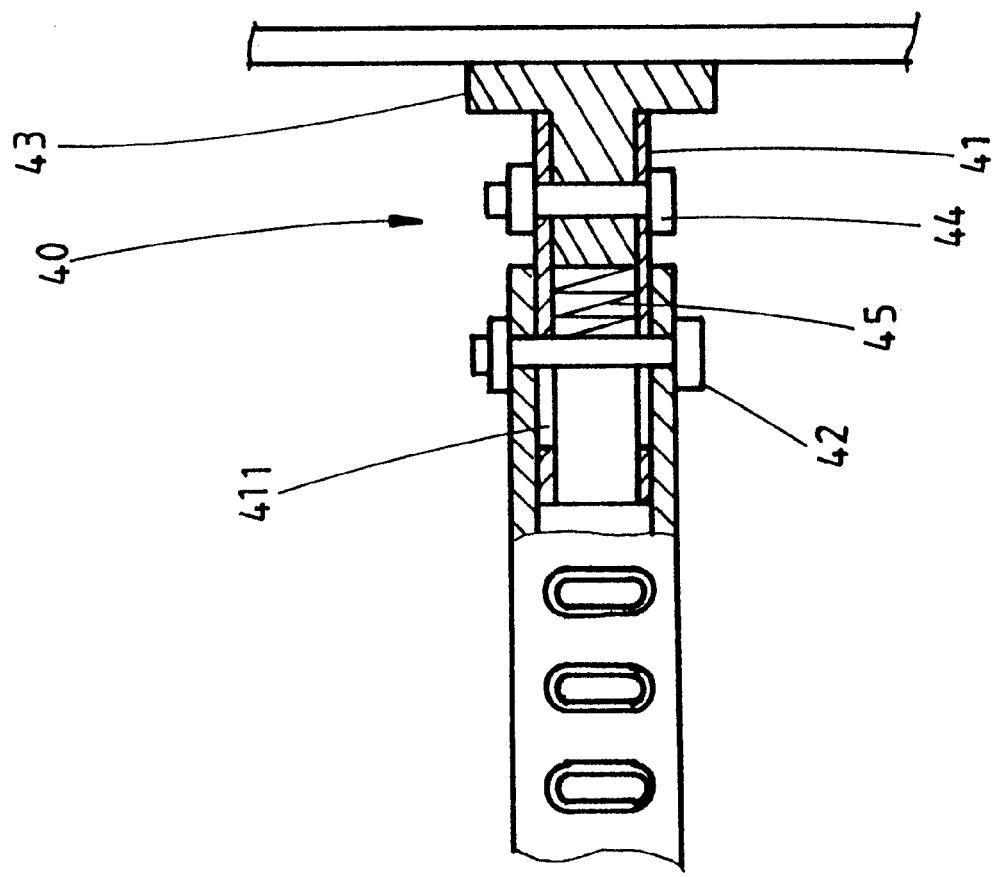
FIG. 8 is a schematic view illustrating an operation of a cargo positioning frame of a second preferred embodiment in accordance with the present invention.

Referring to FIGS. 7 and 8, a shock-absorbing device 40 is connected to the tube 100. The shock-absorbing device 40 comprises a connection pipe 41 inserted in the tube 100, a base seat 43 inserted in the connection pipe 41, a compression spring 45 inserted in the connection pipe 41, and a bolt 44 fastening the connection pipe 41 and the base seat 43 together. The connection pipe 41 has a circular through hole 411. A retainer rod 42 fastens the tube 100 and the connection pipe 41 together via the circular through hole 411. The compression spring 45 is disposed between the retainer rod 42 and the base seat 43.

The present invention is not limited to the above embodiments but various modification thereof may be made. Furthermore, various changes in form and detail may be made without departing from the scope of the present invention.

I claim:

1. A cargo positioning frame comprising:

a tube having a plurality of positioning holes and a plurality of upper chamfer angled holes, and each of the upper chamfer angled holes communicating with one of the positioning holes.

2. A cargo positioning frame comprising:

a tube;

a shock-absorbing device connected to the tube, the shock-absorbing device comprising a connection pipe inserted in the tube, a base seat inserted in the connection pipe, a compression spring inserted in the connection pipe, a bolt fastening the connection pipe and the base seat together, a retainer rod fastening the tube and the connection pipe together, and the compression spring disposed between the retainer rod and the base seat.

* * * * *